Aug. 22, 1939.   H. ROMANDER   2,170,664

TEMPERATURE COMPENSATION DEVICE

Filed Jan. 2, 1937

INVENTOR
HUGO ROMANDER
BY
ATTORNEY

Patented Aug. 22, 1939

2,170,664

UNITED STATES PATENT OFFICE 2,170,664

TEMPERATURE COMPENSATION DEVICE

Hugo Romander, Irvington, N. J., assignor to Federal Telegraph Company, Newark, N. J., a corporation of California Application January 2, 1937, Serial No. 118,915

1 Claim. (Cl. 236—1)

This invention relates to oven temperature compensation and particularly to ovens in which constant temperature is maintained by means of thermostatically controlled heaters.

This invention is capable of use in any system which requires constant temperature and is of particular value for maintaining the oscillator or frequency determining circuit of a radio transmitter at a constant frequency or for use with any scientific or laboratory equipment requiring precise temperature control. As is well known, the constants of various elements such as condensers, inductance coils or piezo-electric crystals in a radio frequency oscillator may vary with the changes in temperature and thus change the frequency of the oscillations generated. To attempt correction of this condition ovens have been constructed comprising a heat insulated inner compartment or chamber and an outer compartment with a heater provided therein and a thermostat for controlling the heater, said thermostat being arranged adjacent the inner compartment, so as to continuously bathe the outer walls of the inner compartment with air at a constant temperature. However, it has been found that heat losses due to radiation from walls of the inner compartment not adjacent to the heating chamber vary with the outside temperature and changes in temperature occur in the inner compartment with variations in the ambient temperature.

It is an object of my invention to arrange the heater element and thermostatic control in such an oven in positions to more nearly compensate for said heat losses.

It is a further object of my invention to provide means to control the heater in accordance with changes in the ambient temperature to compensate for heat losses from the inner compartment of such an oven.

While in the example chosen to illustrate my invention I have shown an oven provided with two heating compartments, it is to be understood that any desired number, one or more, of heating compartments may be used, depending only on the use to be made of the heat controlled chamber. For example, if only one face of the oven is needed to provide access thereto, all the remaining faces may be provided with heating compartments.

With these and further objects in view, the invention is particularly described in connection with the accompanying drawing in which, Fig. 1 represents a perspective view in cross section of an oven constructed in accordance with my invention.

Figure 1:
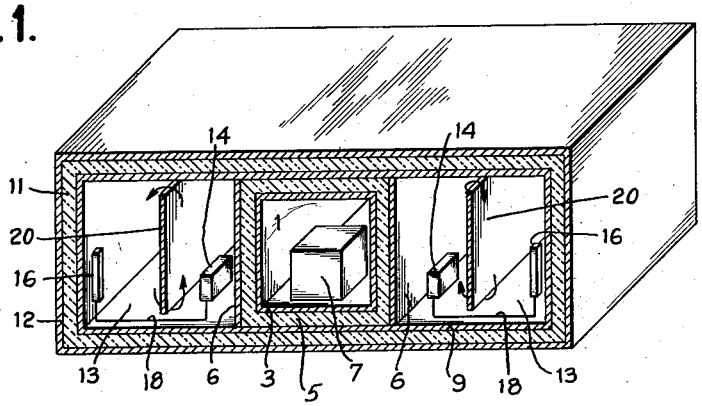

In the drawing, in which similar reference characters on the various figures indicate similar elements, 1 indicates the inner heat controlled compartment of an oven, which is provided with walls 3 which may be of metal or any suitable material, covered with any desired heat insulating material 5 such as rock wool, for example. In this compartment, apparatus which is to be maintained at constant temperature is diagrammatically represented by block 7. Surrounding said inner compartment 1 is wall 9 of any suitable material, insulating material 11 and outer wall 12, which, together with the outer walls 6 of said inner compartment form two heater compartments 13. In said heater compartments and adjacent the outer walls 6 of said heat controlled compartments are provided heater elements 14, which may be of any desired type, for example, electric heating elements. Adjacent the outer walls of said heater compartments are arranged thermostat control units 16, which are connected to said heater units 14 as schematically indicated at 18. Between said heater element and said thermostat unit is provided a baffle 20 which may be of metal or any suitable material, to assure proper circulation of the heated air in said compartment.

In the oven as described, heated air from the heater 14 rises adjacent the outer wall 6 of the inner compartment, passes over baffle 20 and thermostat control unit 16 and back to the heater under baffle 20, as indicated by arrows. In passing by the walls of said compartment the heated air loses some of its heat and thus lowers in temperature. If the temperature drops below a desired limit, thermostat control element 16 functions to increase the temperature of heater 14 through any well known means, not shown, for example, through electrical controls. By arranging the thermostat near the outer wall of said heater compartment the temperature at said thermostat varies more nearly in accordance with variation in outside temperature and tends to maintain the temperature of the heater at a value to more closely compensate for variations in the ambient temperature. If desired, the outer wall adjacent the thermostat may be made less perfectly insulated than the other walls to provide for greater heat exchange at this point.

Figure 2:
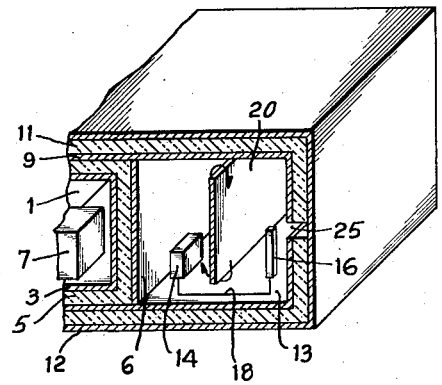
Fig. 2 shows a fragmentary section of an oven similar to that of Fig. 1, illustrating a modification of my invention.
Figure 4:
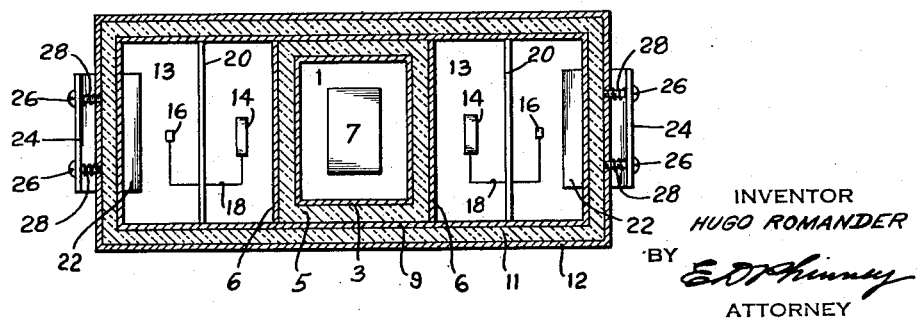

In Fig. 2 a modification of said oven is illustrated. The outer wall of the metallic lining 9 of heater compartments 13 and the heat insulating material 11 are provided with an aperture 25 adjacent control unit 16. By reason of this aperture changes in the ambient temperature of the outside air may more readily be communicated to the thermostat control element 16 and accordingly, more precise control of the heater unit 14 in response to these changes in temperature, is obtained. It has been found that with this provision as shown the ambient temperature may change as much as 20° C. or 25° C. without changing the temperature of the inner compartment more than 1° C. An adjustable heat insulating strip may be provided for adjustment on the wall adjacent said aperture to further control the heat exchange.

Figure 3:
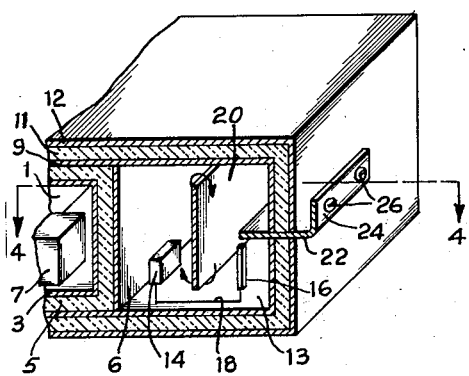
Fig. 3 shows another fragmentary view of an oven similar to that of Fig. 1, to illustrate a further modification of my invention and, Fig. 4 shows a plan view in section taken on the line 4—4 of Fig. 3.

In Fig. 3 is illustrated a modification which permits substantially exact control of the temperature of the inner compartment of said oven. In this figure all the elements of construction of the oven are substantially the same as shown in Fig. 1. However, the outer walls of heater compartments and insulation on the outer walls are apertured and a heat conducting member or vane 22 is inserted therein. Said vane 22 is preferably adjustably mounted for extension variable distances into said compartment 6, to control the heat exchange therein at points adjacent said thermostat 16. Any suitable means may be used for this adjustment. In the form illustrated vane 22 is provided with a flange 24 through apertures in which are inserted screws 26, threaded into outer wall 12 of said oven. Spring means 28 serve to maintain flange 24 tightly against the heads of screws 26. Said heat conducting vane 22 is arranged at a point adjacent thermostat control element 16. By adjusting the distance between vane 22 and thermostat control element 16, said thermostat control element may be made more or less sensitive to changes in ambient temperature and an extremely precise control of heater element 14 may be obtained so as to maintain the inner heat control compartment 1 at a constant temperature. By proper adjustment of said vane 22 the thermostat control element 16 may be controlled so as to maintain the heater 14 at a higher temperature upon decrease of ambient temperature and heat losses from compartment 1 may thus be compensated for, so as to maintain said compartment at substantially constant temperature regardless of variations in the outside temperature. Adjustment of vane 22 can be made so that the temperature of the inner compartment even increases in response to lowering of the outside temperature.

While my invention has been described with reference to particular embodiments thereof, as illustrated in the figures of the drawing, such description is not to be considered as a limitation thereof, as my invention contemplates any modifications within the scope of the appended claim.

I claim:

A temperature control system for maintaining a substantially constant temperature within an enclosure in the presence of an ambient atmosphere of varying temperature, comprising a controlled chamber and a controlling chamber contiguous to each other and having a common wall between them, a baffle partially dividing said controlling chamber into two compartments, the first of which is adjacent said common wall and the second of which is remote from said common wall, a heater in said first compartment, a temperature sensitive device in said second compartment positioned to receive heat principally by convection, means for controlling said heater from said device, and means for providing an increased thermal conductivity from said second compartment to the ambient atmosphere.

HUGO ROMANDER.